US005917922A

United States Patent [19]

Kukurudza

[11] Patent Number: 5,917,922

[45] **Date of Patent: *Jun. 29, 1999**

[54] METHOD OF OPERATING A SINGLE LOUD SPEAKER DRIVE SYSTEM

[76] Inventor: Vladimir Walter Kukurudza, 12 Castille Crescent, Keswick, Ontario, Canada, L4P 3K9

[ * ] Notice: This patent is subject to a terminal disclaimer.

[21] Appl. No.: 08/784,065

[22] Filed: Jan. 17, 1997

Related U.S. Application Data

[63] Continuation-in-part of application No. 08/555,187, Nov. 8, 1995, Pat. No. 5,615,272.

[51] Int. Cl.[6] .................... H04B 15/00

[52] U.S. Cl. .................... 381/94.9; 381/117; 381/99

[58] Field of Search .................... 381/94.9, 99, 100, 381/111, 117, 120, 59, 401

[56] References Cited

U.S. PATENT DOCUMENTS

| | | | |
|---|---|---|---|
| 1,645,282 | 10/1927 | Hanna . | |
| 1,674,683 | 6/1928 | Hahnemann . | |
| 1,992,300 | 2/1935 | Fanger . | |
| 2,194,175 | 3/1940 | Wilhelm . | |
| 2,897,291 | 7/1959 | Burke . | |
| 3,196,211 | 7/1965 | Kessenich . | |
| 3,766,334 | 10/1973 | Burke . | |
| 3,798,374 | 3/1974 | Meyers . | |
| 3,838,216 | 9/1974 | Watkins . | |
| 4,034,165 | 7/1977 | Haeder . | |
| 4,107,479 | 8/1978 | Heil . | |
| 4,130,725 | 12/1978 | Nagel . | |
| 4,160,133 | 7/1979 | Wiik . | |
| 4,201,886 | 5/1980 | Nagel . | |
| 4,207,430 | 6/1980 | Harada . | |
| 4,229,618 | 10/1980 | Gamble . | |
| 4,475,233 | 10/1984 | Watkins . | |
| 4,504,704 | 3/1985 | Ohyaba et al. | 381/117 |
| 4,573,189 | 2/1986 | Hall . | |
| 4,597,100 | 6/1986 | Grodinsky et al. . | |
| 4,598,178 | 7/1986 | Rollins . | |
| 4,617,621 | 10/1986 | Kuroki . | |
| 4,718,100 | 1/1988 | Brisson . | |
| 4,727,584 | 2/1988 | Hall . | |
| 4,754,102 | 6/1988 | Dzurak . | |
| 4,897,879 | 1/1990 | Geluk . | |
| 4,945,189 | 7/1990 | Palmer . | |
| 5,373,563 | 12/1994 | Kukurudza | 381/94 |
| 5,519,781 | 5/1996 | Kukurudza | 381/94 |
| 5,615,272 | 3/1997 | Kukurudza | 381/94.9 |

FOREIGN PATENT DOCUMENTS

| | | |
|---|---|---|
| 114011 | 9/1979 | Japan . |
| 1254608 | 11/1971 | United Kingdom . |

OTHER PUBLICATIONS

The Audio Cyclopedia pp. 367 to 385.

*Primary Examiner*—Curtis A. Kuntz
*Assistant Examiner*—Duc Nguyen

[57] ABSTRACT

A method of operating a single speaker driver circuit having, a low frequency input coil connected between an audio circuit output and the input of the speaker, a low frequency return coil, connected between the return of the speaker and the return of the audio signal, the low frequency return coil being bifilar wound with the low frequency input coil, and a higher frequency input coil connected between the audio circuit output and the return of the audio circuit, and a secondary coil connected between the input of the speaker, and ground, the higher frequency input coil and the secondary coil being bifilar wound with one another and acting as the primary and the secondary of a transformer so the higher frequency signals passing through the higher frequency input coil induce secondary signals in the secondary coil, and a method of operating an audio frequency reproduction system using such a driver circuit.

9 Claims, 2 Drawing Sheets

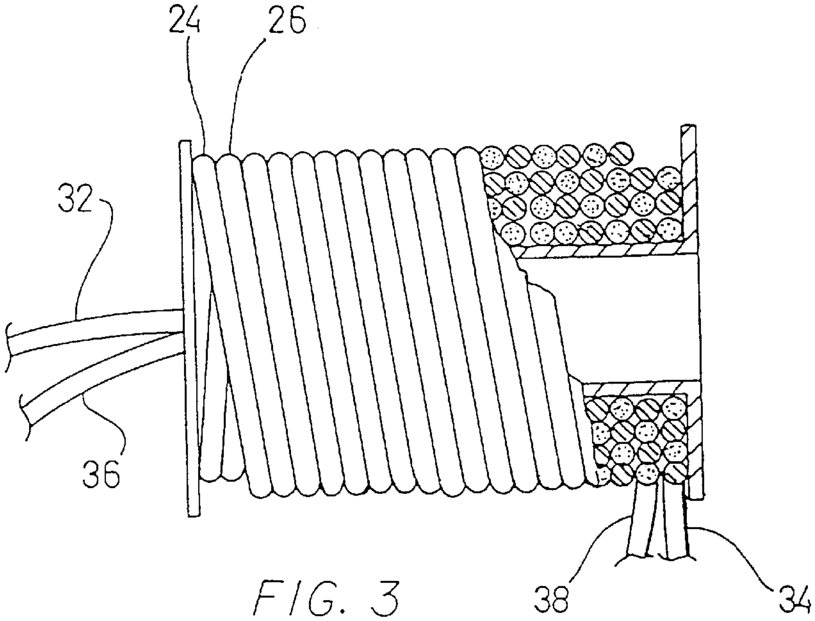
F/G. 3
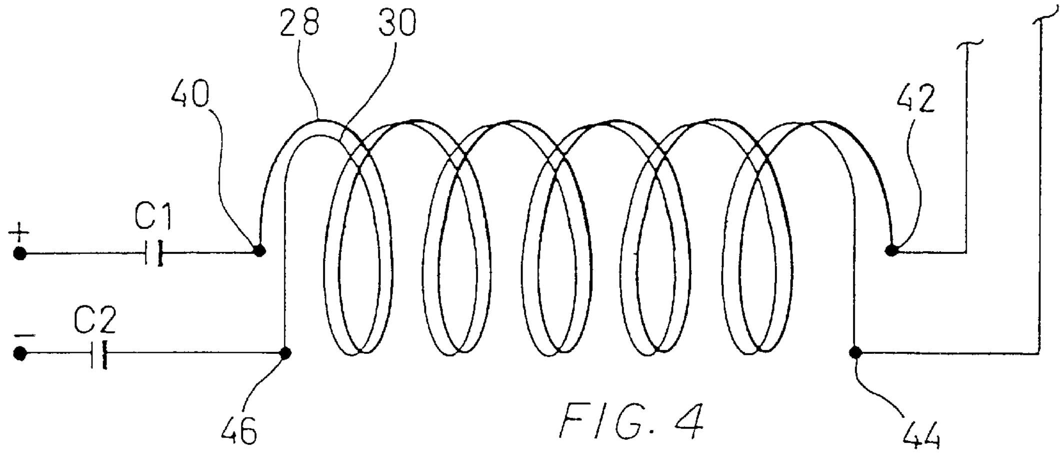
F/G. 4
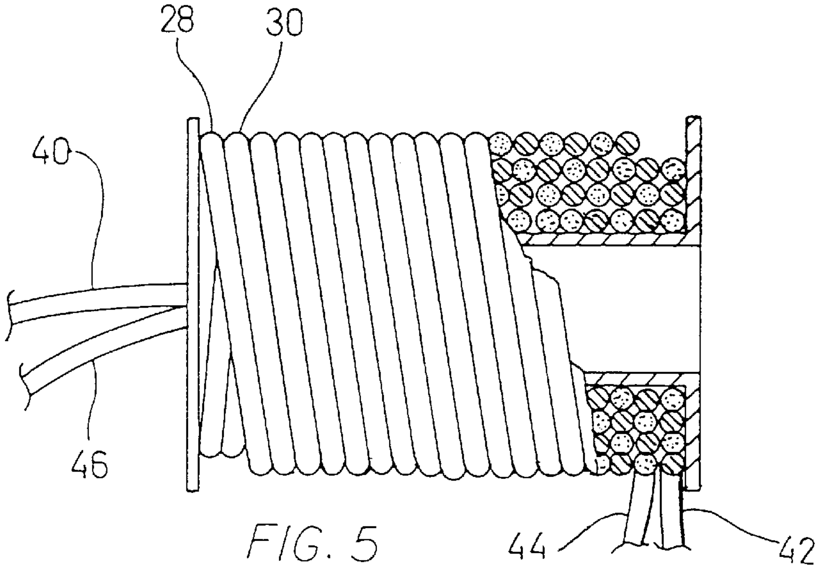
F/G. 5

METHOD OF OPERATING A SINGLE LOUD SPEAKER DRIVE SYSTEM

This application is a continuation-in-part of U.S. application Ser. No. 08/555,187, title Single Loud Speaker Drive System, inventor V. K. Kukurudza, filed Nov. 8, 1995, now U.S. Pat. No. 5,615,272.

FIELD OF THE INVENTION

The invention relates to a method of operating a drive circuit for driving single speaker coil driven speaker systems and to a method of operating an audio reproduction system incorporating such a drive circuit.

BACKGROUND OF THE INVENTION

Single speaker systems involving the use of single coil driven speaker are usually involved relatively primitive drive circuits connected between the signal source and the loud speaker. Generally speaking such single speakers systems are built down to a price, and a degree of clarity and performance may be sacrificed. Such speaker systems may involve simple hand held tape recorders, telephone systems, two-way hand held radio communication systems, hand held loud speakers such as are used in crowd control, portable radio, aircraft communication, intercom systems, auto radio, and military mobile radio systems, police radio, and household and apartment communication systems, and in public address systems.

In such single speaker coil driven systems, all of the sound signal frequencies from the amplifier are passed directly through the one coil of the single speaker. This is to be distinguished from the type of situation in more complex audio systems where there are two or three speakers for high, medium and low frequencies. In these systems, complex crossover circuits are used to separate the high, medium and low frequency signals, and direct them to their respective speakers, so that the high, medium, and low range sounds are reproduced separately in the separate speakers.

In a typical single speaker system all of the sounds high, medium and low, are reproduced in the single speaker.

As is well known, the resulting sound as heard by a listener is very far from satisfactory, and is frequently subject to distortion.

It is believed that a significant factor leading to such distortion is the distortion of the signals as they pass through the speaker coil, due to back EMF noise signals induced in the speaker coil as the signals pass through it. In some driver systems for single speakers, there may be one or more coils connected to the speaker coil itself. As the audio signal currents pass through these coils, they will inevitably create further "back EMF" noise.

In U.S. Pat. No. 5,373,563, Inventor, Vladimir W. Kukurudza, Title: SELF DAMPING SPEAKER MATCHING DEVICE, dated Dec. 13, 1994, there is disclosed a crossover system for dividing an audio signal into high, medium, and low frequencies, and directing them to the appropriate speakers, and at the same time, reducing the distortion caused in those speakers by the passage of the audio signal currents through them.

That system has proved to be highly effective with multiple speaker systems having either high or low, or high, medium, and low speakers. However, the system is not suitable for use with single speakers, where crossover circuits are not used.

As mentioned above, the present invention is directed to the method of operating single speaker systems, and the problems of reducing the distortion in such single speaker systems, and is to be distinguished from the problems encountered in multiple speaker systems.

BRIEF SUMMARY OF THE INVENTION

With a view to achieving the improvements described above in single speaker systems the invention comprises a the method of operating an audio signal reprodction system, said system having, a source of audio signals at least one single coil driven speaker, a speaker drive circuit for communicating said signals to said speaker and for reducing unwanted noise in said speaker, a low frequency input coil connected between the output of said audio circuit and the input of said single speaker, a low frequency return coil, connected between the return of said single speaker and the return of the audio signal, said low frequency return coil being bifilar wound with said low frequency input coil, whereby signals passing through said low frequency input coil, and through said speaker coil and then through said low frequency return coil will substantially reduce unwanted noise in said speaker, a higher frequency input coil connected between said output of said audio circuit and a location between the return of the speaker and the input to the low frequency return coil, and, a secondary coil connected between the input of said speaker, and ground, said higher frequency input coil and said secondary coil being bifilar wound with one another, and said secondary coil acting as the secondary of a transformer, and being adapted to be excited by higher frequency signals passing through said higher frequency input coil to induce secondary signals which are passed to said speaker input, and comprising the steps of, passing low frequency signals through said low frequency coil, and passing said high frequency signals through said high frequency coil and thereby inducing secondary signals in said secondary coil, and combining said low frequency signals and said secondary signals and passing them through said speaker coil.

The invention further provides for the method as described above and including the steps of passing said signals from said speaker through a low frequency output coil which is bifilar wound with said low frequency coil.

In the illustrated form of the invention, each of the four coils is considered to have an input end and return end, the signals being carried from the input end through the coils to the return end, for the purposes of explanation. In the winding of the first pair of bifilar coils, the input ends of each coil in the first pair are placed together and the return ends of each of the coils in the first pair are placed together, so that the currents flow through the coils in the first pair of coils from their respective input to their respective return ends in the same direction.

The invention also envisages the method of operating an audio speaker system drive system, in accordance with the method described.

The invention is equally applicabale to a system having only one single coil driven speaker or to a system have two or more single coil driven speakers.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 3 is a cut away side elevation corresponding to FIG. 2 illustrating the bifilar winding of the first pair of coils;

FIG. 4 is a schematic circuit diagram showing the second pair of bifilar wound coils, illustrated in FIG. 1, and, FIG. 5 is a cut away side elevation corresponding to FIG. 4 illustrating the bifilar winding of the second pair of coils.

DESCRIPTION OF A SPECIFIC EMBODIMENT

Figure 1:
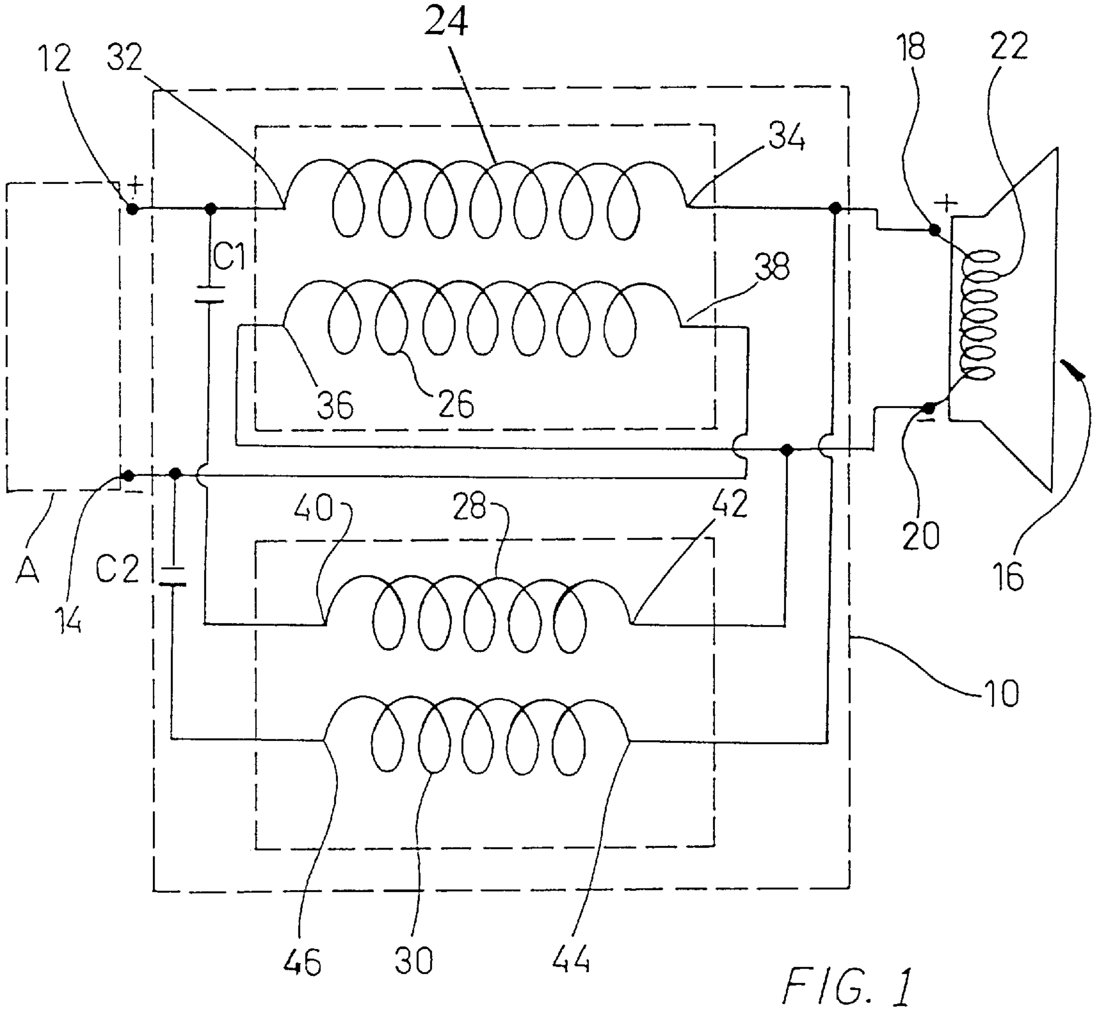
FIG. 1 is a schematic circuit diagram showing a single speaker audio reproduction system, and the driver circuit associated therewith in accordance with the invention.

Referring first of all to FIG. 1, it will be seen that the invention is there illustrated in the form of an audio sound reproduction system having a source of audio signals A, connected to a single speaker driver circuit indicated generally as 10. Circuit 10 is shown a being connected to an audio signal input 12 and return 14 of source A. This will be understood to represent any form of audio signal generator or source, or amplifier.

The driver circuit 10 is shown connected to a single loud speaker 16 having an input 18 and return 20, and a single coil 22. While only one such speaker is shown it will be appreciated that two or more such speakers may be incorporated in a single system. Accordingly for the purpouses of this description the use of the singular term speaker is to be understood as including the plural.

For the purposes of this explanation it will be considered that the audio signals travel from the input 12 through the driver circuit 10 to the input 18 of the speaker 16, and exit from the speaker 16 at the return 20, and return through the driver circuit to the audio circuit at the return 14. In accordance with well established scientific convention, the audio currents are considered for the purposes of explanation as passing in the manner described above, i.e. from + to −.

As further illustrated in FIG. 1, the driver circuit 10 is represented as having a first pair of coils 24 and 26 and second pair of coils 28 and 30. These coils are illustrated in their respective phantom boxes as side by side, but in fact each pair is wound in a bifilar manner as illustrated in FIGS. 2, 3, 4 and 5.

The first pair of coils 24 and 26 comprise a low frequency input coil 24, having an input end 32 and return end 34. The second coil 26 of the first pair comprises a low frequency return coil 26, and has an input end 36 and return end 38.

Figure 2:
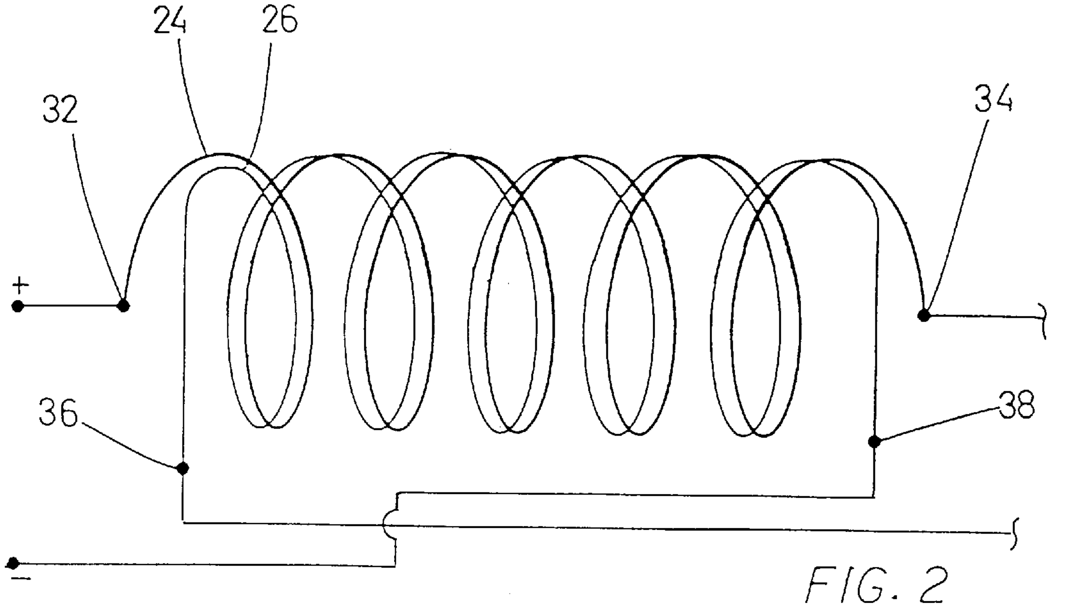
FIG. 2 is a schematic circuit diagram showing the first pair of bifilar wound coils, it being understood that this FIG. 2 illustrative of the winding of the first pair of coils illustrated in FIG. 1.

The two coils 24 and 26 are wound in a bifilar manner as generally illustrated in FIG. 2 and 3, with their coil inputs 32–36 adjacent one another and their coil returns 34–38 adjacent one another. Signal currents passing through the two coils pass in the same direction through both coils 24 and 26. However, as will become apparent from the following description, the signals in coil 26 are somewhat out of phase with the signals in coil 24 by between about 45 and 90 degrees, due to the phase shift resulting from passage of the signals through the coil 22 of the speaker.

The input, or low frequency coil 24 is tuned to receive the low frequency audio wave components of the signal. The low frequency audio signals pass through coil 24 to the input of the speaker. Due to the action of the coil 24 however there is a slight time delay involved. After passing through the speaker coil these low frequency signals then pass to the input end 36 of coil 26. However due to the effect of the speaker coil there is, again, a slight further time delay. As a result there is an a modest out of phase relation between the signals in coil 24 and the signals in coil 26 which effectively produces a suppression of noise signals that would otherwise be generated in coil 24 and also to some extent in the speaker coil 22, thus significantly improving the clarity of reproduction.

The second pair of coils 28 and 30 comprise a higher frequency, primary coil 28 and secondary coil 30. Coil 28 has a positive end 40 and return end 42.

Secondary coil 30 has a positive end 44 and a ground end 46. Primary coil 28 and secondary coil 30 act as the primary and secondary of a transformer. The primary coil 28 receives the high and mid range frequencies, selected through the condenser C1, and from coil 28 these are passed directly to the return side 20 of the circuit between the speaker and coil 26 and thus pass to the negative side of the audio circuit at 14.

These signal currents passing through primary coil 28 in turn excite the secondary coil 30 and induce secondary signal currents, which pass through secondary coil positive end 44 directly to the input side 18 of the speaker 16. The negative end 46 of the secondary coil 30 is connected to the condenser C2 which in effect speeds up the secondary currents. The opposite side of condenser C2 is connected to ground to complete the circuit.

The coils 28 and 30 are wound in a bifilar manner as illustrated in FIG. 4 and 5. The coils 28 and 30 are connected so that signal currents induced through the secondary coil 30 will pass in the same direction, as the audio signal currents passing through the primary coil 28. Primary coil 28 induces higher frequency signal currents in secondary coil 30 more or less instantaneously, and the higher frequency induced signals are communicated to the input side of the speaker. As a result both the low frequency and the higher frequency signals reach the speaker coil at approximately the same time.

The primary and secondary coils 28 and 30, and the condensers C1 and C2 all produce phase shifts in the higher frequency audio signals, so that when they reach the input of the speaker they are substantially in phase with the low frequency audio signals from the coil 24.

The method according to the invention will thus be seen to consist basically of passing low frequenct audio signals through said low frequency input coil and then through said speaker coil and then through said low frequency return coil, passing said higher frequency signals through said higher frequency coil, said secondary coil acting as the secondary of a transformer, and being excited by the higher frequency signals passing through said higher frequency input coil to induce secondary signals which are passed to said speaker input.

The method further includes the steps of said first condenser operating to pass said higher frequency signals to said higher frequency coil, and said second condenser operating to speed up said secondary signals induced in said secondary coil.

The invention further includes the steps of said signals being carried from the input end through the coils to the return end.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A method of operating a single speaker driver circuit for use in association with a source of audio signals and a single coil driven speaker for communicating said signals to said speaker and for reducing unwanted noise in said speaker, said driver circuit having, a low frequency input coil connected between the output of said audio circuit and the input of said single speaker, a low frequency return coil, connected between the return of said single speaker and the return of the audio signal, said low frequency return coil being bifilar wound with said low frequency input coil, whereby signals passing through said low frequency input coil, and through said speaker coil and then through said low frequency return coil will substantially reduce unwanted noise in said speaker, a higher frequency input coil connected between said output of said audio circuit and a location between the return of the speaker and the input to the low frequency return coil, and, a secondary coil connected between the input of said speaker, and said return of said audio signal, said higher frequency input coil and said secondary coil being bifilar wound with one another, and said secondary coil acting as the secondary of a transformer, and being adapted to be excited by higher frequency signals passing through said higher frequency input coil to induce secondary signals which are passed to said speaker input, and comprising the steps of:

passing said low frequency signals through said low frequency input coil;

passing said high frequency signals through said high frequency input coil, and thereby inducing secondary signals in said secondary coil;

combining said low frequency signals and said secondary signals and passing them through said speaker coil, and, passing said signals from said speaker coil through said low frequency coil bifilar wound with said input coil thereby suppressing unwanted noise signals in said low and high frequency signals.

2. A method of operating a single speaker driver circuit as claimed in claim 1 wherein said driver circuit includes condensers connected with said higher frequency input coil, and with said secondary coil and including the step of subjecting said higher frequency signals to the action of said condensers.

3. A method of operating a single speaker driver system as claimed in claim 2 and wherein each of the four coils has an input end and return end, the signals being carried from the input end through the coils to the return end.

4. A method of operating a single speaker driver system as claimed in claim 3 and wherein, in said first pair of bifilar coils, the input ends of each coil in said pair are placed together and the return ends of each of the coils in said pair are placed together, so that the signal currents flow through the coils in the first pair of coils from their respective input to their respective return ends in the same direction.

5. A method of operating a single speaker driver system as claimed in claim 3 and wherein, in said second pair of bifilar coils, the input ends of each coil in said pair are placed together and the return ends of each of the coils in said pair are placed together, so that the signal currents flow through the coils in said second pair of coils from their respective input to their respective return ends in the same direction.

6. A method of operating a single speaker driver circuit as claimed in claim 1 and including a first condenser connected between said higher frequency input coil and said output of said audio signal circuit, and a second condenser connected between said secondary coil and ground, said first condenser being operative to pass said higher frequency signals to said higher frequency coil, and said second condenser being operative to speed up said secondary signals induced in said secondary coil.

7. A method of operating a single speaker driver circuit for use in association with a source of audio signals and a single coil driven speaker for communicating said signals to said speaker and for reducing unwanted noise in said speaker, and single speaker driver circuit having, a low frequency input coil connected between the output of said audio circuit and the input of said single speaker, a low frequency return coil, connected between the return of said single speaker and the return of the audio signal, said low frequency return coil being bifilar wound with said low frequency input coil, whereby signals passing through said low frequency input coil, and through said speaker coil and then through said low frequency return coil will substantially reduce unwanted noise in said speaker, each of said input and return coils having input ends and return ends and wherein said input ends in said pair are placed together and wherein said return ends of each of said coils in said pair are placed together, so that the currents flow through said input and return coils from their respective input ends to their respective return ends in the same direction, a higher frequency input coil connected between said output of said audio circuit and a location between the return of the speaker and the input to the low frequency return coil, and, a secondary coil connected between the input of said speaker, and ground, said higher frequency input coil and said secondary coil being bifilar wound with one another with said coils acting as the primary and secondary of a transformer, and comprising the steps of:

passing said low frequency signals through said low frequency input coil and then through said speaker coil and then through said return coil;

passing said higher frequency signals through said higher frequency coil, said secondary coil being excited by said higher frequency signals passing through said higher frequency input coil to induce secondary signals which are passed to said speaker input, each of said coils having input ends and return ends, and wherein in said second pair of bifilar coils, said input ends of each coil in said pair are placed together and said return ends of each of the coils in said pair are placed together, so that the currents flow through said higher frequency coil and said secondary coil in said second pair of coils from their respective input to their respective return ends in the same direction.

8. A method of operating a single speaker driver circuit as claimed in claim 7 and wherein said driver circuit includes a first condenser connected between said higher frequency input coil and said output of said audio signal circuit, and, a second condenser connected between said secondary coil and ground and including the steps of subjecting said higher frequency signals to the action of said first condenser to pass the same to said higher frequency input coil, and subjecting the secondary signals induced in said secondary coil to the action of said second condenser whereby to speed up said secondary signals.

9. A method of operating an audio sound reproduction system said system having, a source of audio signal, a single coil driven speaker, a speaker drive circuit for communicating said signals to said speaker and for reducing unwanted noise in said speaker, and having, a low frequency input coil connected between the output of said audio circuit and the input of said single speaker, a low frequency return coil, connected between the return of said single speaker and the return of the audio signal, said low frequency return coil being bifilar wound with said low frequency input coil, whereby signals passing through said low frequency input coil, and through said speaker coil and then through said low frequency return coil will substantially reduce unwanted noise in said speaker, a higher frequency input coil connected between said output of said audio circuit and a location between the return of the speaker and the input to the low frequency return coil, and, a secondary coil connected between the input of said speaker, and said return of said audio signals, said higher frequency input coil and said secondary coil being bifilar wound with one another and functioning as the primary and secondary of a transformer respectively, and comprising the steps of:

passing said low frequency signals through said low frequency input coil and then through said speaker coil and then through said return coil;

passing said higher frequency signals through said higher frequency coil said secondary coil acting as the secondary of a transformer, and being excited by higher frequency signals passing through said higher frequency input coil to induce secondary signals which are passed to said speaker input.

* * * * *